9688X RELATED DOC
J. D. Buzzell,
Dressing Stone.
No. 192.
Reissued May 15, 1837.
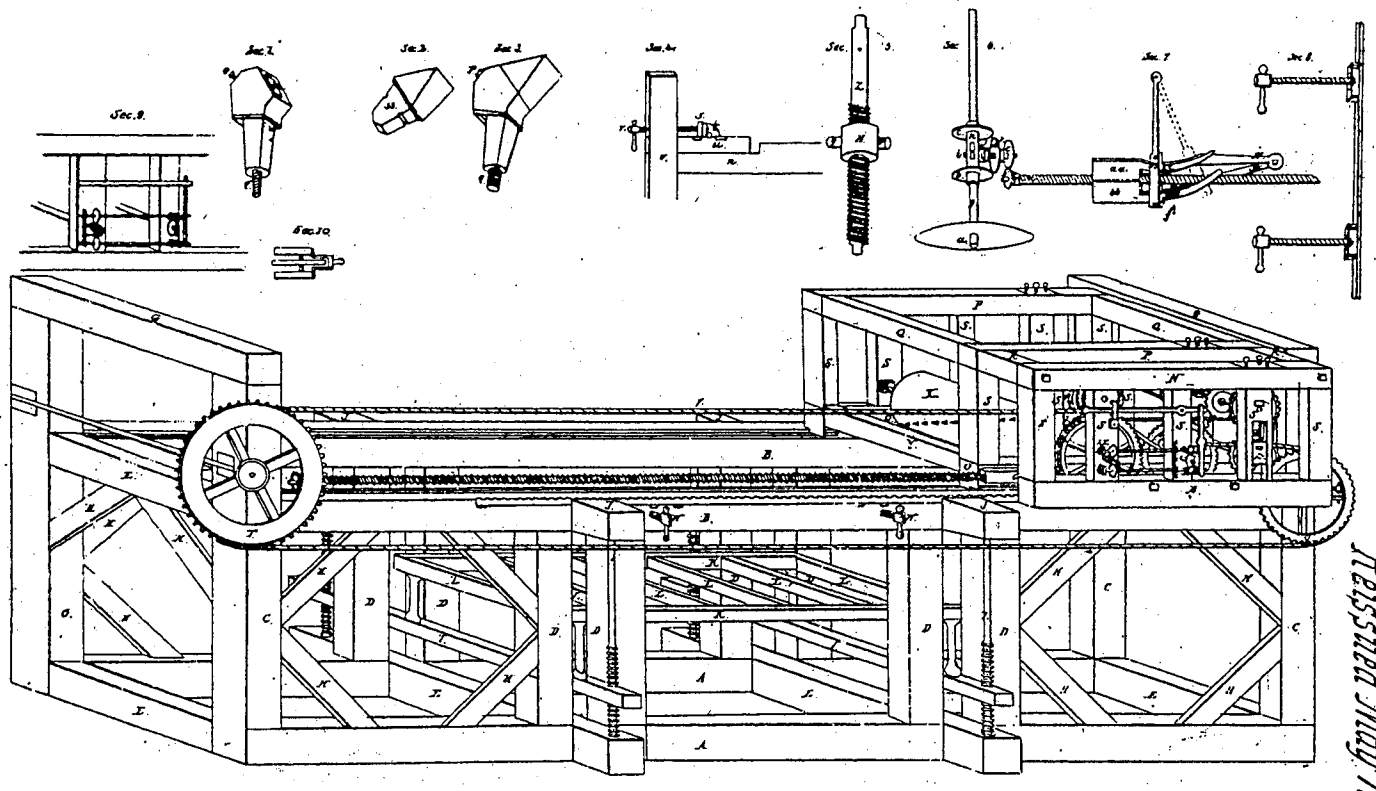

2 Sheets. Sheet 2.
J. D. Buzzell.
Dressing Stone.
Reissued May 15, 1837.
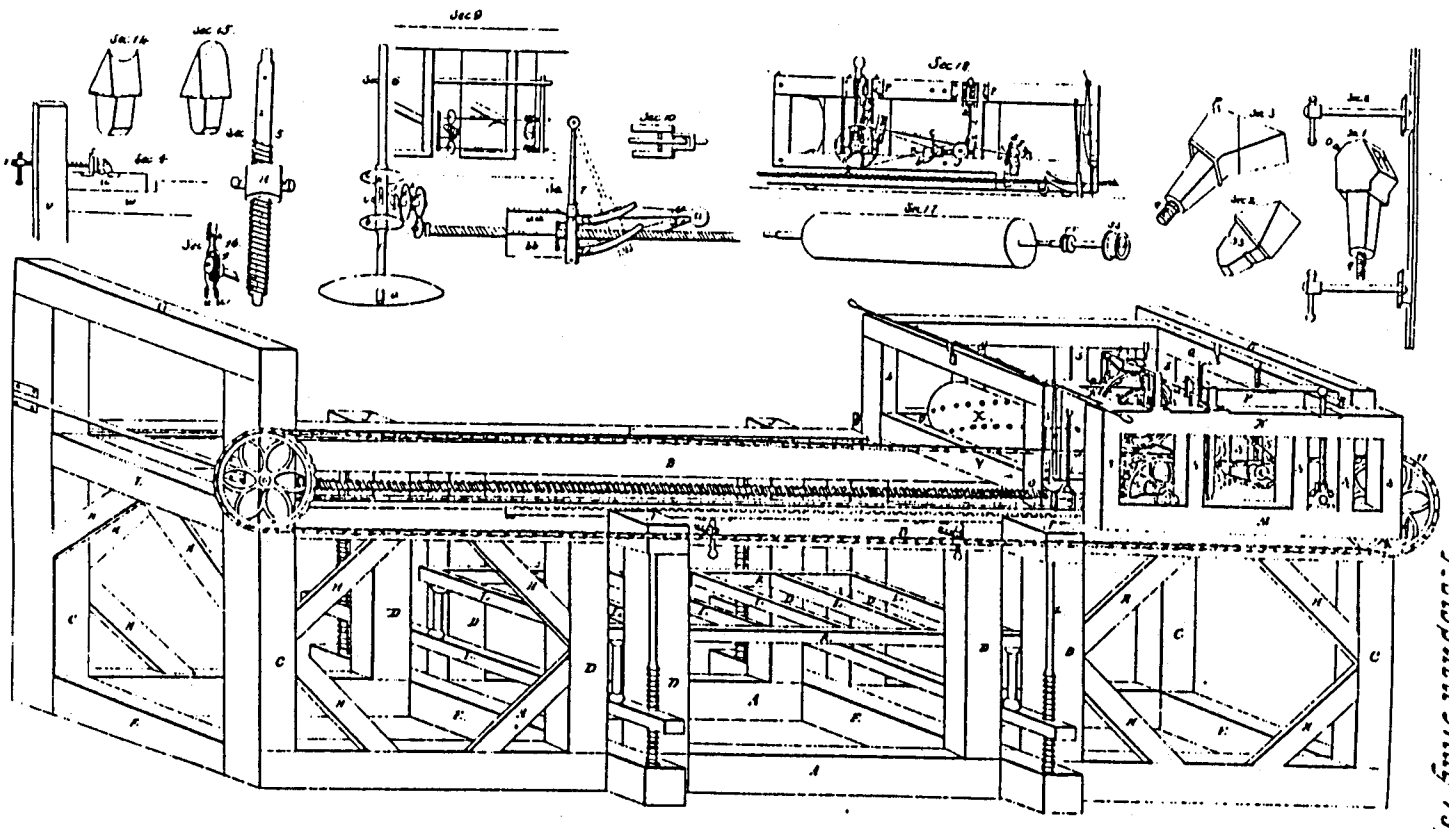

UNITED STATES PATENT OFFICE.

J. D. BUZZELL, OF CAPE ELIZABETH, MAINE.

MACHINE FOR CUTTING, DRESSING, AND POLISHING ALL KINDS OF STONE.

Specification forming part of Letters Patent No. 192, dated June 2, 1836; Reissued May 15, 1837.

X9688 Rel Doc NO.

*To all whom it may concern:*

Be it known that I, JOHN D. BUZZELL, of Cape Elizabeth, in the county of Cumberland and State of Maine, have invented a new and useful Machine for Cutting, Dressing, Grooving, Beading, and Polishing Granite, Marble, and other Stone; and I do hereby declare the following as a full and exact description of the same.

My invention consists in part of an oblong square frame standing on upright posts of any length, width, and height that may be desired.

My machine which I have invented and put in operation consists of a frame eighteen feet long, four feet wide, including the timbers, and four feet high from the top of the ground sill to the top of the lateral rails or beams. The head pieces or bends composing the ends of this frame are six feet two inches high and consist of two upright posts marked C, at each end six inches by eight mortised so as to receive the tenons of the lateral rails or beams with cross pieces on the top of the same dimensions marked G, and also cross pieces marked E at the height of the lateral rails, and at the sills. At spaces nearly equally distant from each other between the head pieces or bends there are placed two pairs of upright posts marked C, at each end six inches by eight mortised so as to receive the tenons of the lateral rails or beams with cross pieces on the top of the same dimensions marked G, and also cross pieces marked E at the height of the lateral rails and at the sills. At spaces nearly equally distant from each other between the head pieces or bends there are placed two pairs of upright posts marked D on each side of the frame under the lateral rails, with a space between the pairs of eight inches for the purpose of receiving a transverse beam marked I so constructed between each of these pairs of upright posts as to receive and support the platform on which is placed the stone, marble or other material to be operated upon. That part of the machine between the pairs of posts and head pieces or bends of the frame at the ends are strengthened by twelve small braces marked H. Between the pairs of posts that are inserted in the sills and lateral rails there are placed transversely and immovably on a level with the sills, two beams marked F, made of white oak or other solid wood, eight inches square, six feet and six inches long projecting on each side of the frame fifteen inches. Exactly over these transverse beams there are inserted by dovetail and secured by joint bolts to the lateral rails a piece of hard wood marked J of the same material as the transverse beam below, projecting fifteen inches on the outside of the lateral rails aforesaid conforming in size and shape to the projections of the transverse beams or immovable pieces below. In each end of these transverse beams or sills there is inserted an iron cup or "step" formed so as to receive the end of an upright screw marked Z and prevent the end of it from sinking into the wood. This step is about eight inches from the outside of the frame and in the center of the transverse beam. In the ends of the corresponding pieces exactly over the ends of these transverse beams or sills and also over the cups or steps there are inserted cast iron boxes for the purpose of securing and receiving the upper ends of the upright screw. The cups or steps are made of a hard metallic substance of such composition as not to wear rough by the turning of the screw. These screws are four in number, four feet long, and two inches in diameter, cut with a square thread, one end resting in the step aforesaid, and the other in the box above. Two-thirds of the lower part of these screws are threaded and near the upper end and above the threaded part of the screw there is inserted two holes through each screw at right angles to each other for the purpose of receiving an iron lever to turn the screw. These screws are for the purpose of raising or lowering the stone or other material to be operated upon.

Exactly over the lower transverse beams or sills, marked on the annexed drawing F, and between the pairs of upright posts there are placed the two transverse sills or beams marked I as aforesaid six feet six inches in length and six inches square through the ends of which pass the upright screws. The ends of these transverse movable beams rest on nuts as represented in section 5, letter H, through which pass the screws made of cast iron or other composition so constructed by means of projections as represented in said section 5, letters *y—y*, on each side of the nut, and so embedded in the transverse movable beams by means of being let into a groove as not to turn or revolve with the screw. Thus when the screw revolves the nut being confined the ends of the movable beams are raised and depressed at pleasure. These nuts are of a new formation and the ends of the movable beams are adapted to them resting only on their centers so that one end of the beam may be raised or lowered without injury to the nut or screw. Over these movable transverse beams and in the space inside of the frame is placed a platform the sides of which are marked K as represented in the annexed drawing, seven feet long. This platform is three feet wide and is made of white oak or other strong wood with cross pieces marked L five inches square overlaid with iron plates for the purpose of holding the stone, marble or other material to be operated upon. This platform is supported at each end by four upright iron posts ten inches long and one and a half inches in diameter which posts rest on steps in the transverse movable timbers. On each end of these posts are round knobs and these knobs are inserted in boxes or steps of cast iron or other composition which boxes or steps are confined to the frame or platform by screws and the transverse beams below. Over each box or step there is a cover of the same material with a circular hole through its center sufficiently large to receive the main body of the post and admit of a variation in any direction. This cover is fastened to the lower part of the step by four screws so that it confines the post in the step by means of the knob on the end. By means of this kind of joint one part of the platform may be raised or lowered without injury to the other part.

The granite, marble or other stone is confined upon the platform by means of two iron bars seven feet long, two inches and a half wide and three quarters of an inch thick, running parallel with the side rails, and exactly over the sides of the platform. When the stone is placed upon the platform these iron bars are firmly pressed against each side of it by means of screws which pass through the side rails marked W and fastened into a loop in the iron bar by means of a nut. A sectional drawing of the iron bar the loop and the screw is represented at section eight on the plan hereunto annexed.

On the inside of the top beams or lateral rails there is grooved or rabbeted a piece three inches square extending the whole length of the rail. In this space and near the middle of it, is placed an iron rail an inch and one half high and seven eighths of an inch in thickness. The upper part of this rail is beveled and upon the inside edge of this rail there is a projection downward on the inside of the side rails, beveled similar to the upper part of the rail. On these rails is placed a movable carriage four feet ten inces in length, two feet three inches in height. This carriage is bound down to the rail by means of friction rollers connected with projecting irons that are attached to the lower sills of the carriage to prevent it from rising while operating upon stone. These rollers are so adapted as to conform to the bevel of the rail that projects downward as before described. The width is such as to conform to the rails on which it runs. This movable carriage is made of white oak or other strong wood and the fastenings are made with joint bolts. In the lower timbers of this movable carriage which are about five inches square there are placed and fastened upon the under part of the same four iron casters or rollers upon which the carriage moves. These rollers are so adapted as to conform to the bevel of the iron rail. There are upright standards marked S tenoned into the sill and top piece of this movable frame six inches wide and three inches thick for the purpose of securing the shafts and gudgeons to be described hereafter. There must be as many upright standards for the purpose of securing the shafts and gudgeons in the movable frame, on each side as there are number of cylinders to be put in operation at one time, and for each standard on one side of the movable frame or carriage there must be a corresponding standard on the other side of the frame. A space three inches wide and about one foot long is cut through the lower part of these upright standards, with the exception of the standards that support the cutting cylinders, so that the upper part of the standard is entire and the lower part formed into two branches, one and a half inches wide each. In this open space is inserted a slide box three inches wide and three inches thick, grooved on each side, so as to receive the half of an iron bolt, one half inch in diameter on each side of the sliding box passing through the upright standard and running along the inside space projecting so as to pass into the groove of the sliding box, and prevent it from running in any direction except upward and downward. This slide box is about five inches long. Through this box there is made a mortise three fourths of an inch wide and one half an inch high extending through the sliding box and in a direction across the movable carriage. The upper part of this mortise is one half or three fourths of an inch from the top of the sliding box. A round hole is made in the top of the sliding box and through that part of it between the mortise aforesaid and the top. Through the whole length of that part of the standard above the space cut out of it as aforesaid and through the circular hole in the sliding box is inserted a screw three fourths of an inch in diameter and about two feet long. On the end of this screw there is a nut made large enough to fill the whole space of the mortise, which nut receives the screw as it passes downward through the hole in the top of the sliding box, and by this means the sliding box and the screws are connected. The middle of this long screw is also threaded but in an opposite direction from the thread of the screw at the end where it is inserted into the nut in the sliding box. A large nut is placed in the upright standard through which the middle of the screw works, so that when the screw revolves, the nut in the mortise of the slide box revolves with it, and raises and depresses the sliding box at pleasure. These screws are turned by means of an iron lever, which passes through a hole or loop at the top. They are made to project above the top of the movable carriage, when screwed down as far as desirable, about four inches. These sliding boxes on that side of the movable carriage opposite to the gear shaft are constructed with a composition nut two inches square inserted in a square mortise through the middle of the box. Through this nut passes a square threaded screw, one inch and a half in diameter and eight inches in length projecting inside of the movable carriage three inches, on the end of which is a gudgeon to be inserted in a step on one end of the shaft of the cylinder. On the gear of this movable carriage there are inserted in upright standards as before described slide boxes divided into two parts and coupled together with screws as will appear at the mark on the upright standards ± made to operate as the former through which and into which in slide boxes placed in upright standards in the jet corresponding exactly to the gear side of the movable carriage, there is a shaft or shafts on which there are placed pulleys or wheels fifteen inches in diameter, larger or smaller as speed is required, so constructed as to use a belt chain or rope to put the machinery in operation. The corresponding jet or projection is seven inches from the gear side of the movable carriage and is made for the purpose of supporting and securing the ends of the shafts on which the pulleys or wheels are placed and for other purposes hereafter described. This jet corresponds exactly to the gear side of the movable carriage and in the sliding boxes there are placed composition bearings in order to receive the ends of the shafts, and there are placed also in the slide boxes on the gear side of the movable carriage composition boxes through which the shafts pass. This jet is fastened to the gear side of the movable carriage by joint bolts and hard wood timbers. On the inside of the movable frame and in the ends of the several shafts connected as before described in the jet, are couplings so formed that they will mesh into corresponding couplings on the ends of the shafts of the cylinders, and thus give to the cylinders the motion required. The gudgeon on the other side of the frame is inserted into a box in the end of the shaft of the cylinder by which means the cylinders are geared and ungeared at pleasure.

The cylinders are made of cast iron, stone and wood. The drum of the cast iron cylinder is one inch thick and connected to the shaft by cast iron spiders. Around those made of cast iron as marked X is set spirally one or more rows of iron sockets as represented at section 1, on the drawing hereunto annexed, fastened and secured in the drum, by a nut screwed to the end of the socket. These sockets project a little on the outer surface of the cylinder and in them is inserted a chisel or cutter as represented at section 2 secured by a thumb screw or spring as represented at section 1, letter *o*. Tools for beading, molding and grooving used with this cylinder are fastened in the same manner as the chisels or cutters. The chisels or cutters are so formed and set in the sockets that the rotary motion of the cylinder brings the edge of it to strike upon the stone in such a manner as to cut the stone, and dress and polish it fit for building.

The sockets before alluded to are cast iron with an oblong square hole through the head or projection as represented section 1, Fig. 32. This hole is about three-eighths of an inch wide and from one-half to three-fourths of an inch long for the purpose of receiving the shaft of the chisel or cutter as represented section 2 Fig. 33. A side view of the socket and the chisel separate from each other are given in the drawing hereunto annexed marked sections 1 and 2. On both sides of the tenons of the cutters or other tools to be used in the sockets there are small notches or grooves one-eighth of an inch deep and large enough to receive the end of a small screw as before described about three-sixteenths of an inch in diameter which is inserted in the end of the socket for the purpose of fastening the chisels or cutters into the socket.

The chisel or cutter independent of the shaft is in the form of an acute angled triangle. The part from which the shaft projects is the base and the other two sides may be denominated the legs as in the drawing hereunto annexed and marked section 2. The socket which is adapted to this chisel is constructed as will appear in the drawing marked sect. 1. The oblong square hole that passes through the head of this socket does not pass diametrically through it, but passes diagonally through the head of the socket. The advantage of this kind of chisel or cutter is that when the upper part of it is worn off by use it may be taken from the socket and turned with the other side up, by which means a sharp edge is presented and thus the chisels may be turned till they become so short that they will be unfit for use.

The stone cylinders are to be used for the purpose of grinding down and polishing granites marble and other stone and are of various dimensions. One of the cylinders made of wood is covered with leather overlaid with emery, and is used for the purpose of grinding dressing and polishing granite marble or other stone. The other cylinders made of wood are overlaid with map or other cloth and are used as polishers of marble or other stone by applying crocus putty or such other materials as are used for polishing. The cylinders may be used separately or in such numbers as are convenient. They are geared into the movable carriage by an iron coupling at one end, to be connected with a coupling on the shaft, and an iron or composition bearing in the other end into which is inserted the gudgeon as before described in relation to the iron cylinder.

The whole machinery it put in motion by means of cog wheels chains bands or ropes connected with the moving power; when chains bands or ropes are used the machinery is set in motion by means of the chains bands or ropes passing over two wheels or pulleys as represented on each end of the carriage at letters T and U, the shafts of which pulleys run across the main frame at each end and connected thereto by composition boxes in which the shafts run so that the wheels or pulleys revolve on the outer side of the frame in range with the wheels or pulleys connected to the shafts in the gear side of the movable carriage. The shafts of the main pulleys or wheels at the ends of the frame are of wrought iron about two inches in diameter and about four feet six inches long. One of the shafts is connected with and passes through sliding boxes made on the same principle as are the sliding boxes in the upright standards before described. These boxes are confined to the top rails in such a manner as to move only backward and forward by means of a screw and are used for the purpose of tightening or loosening the band chain or rope required for moving the machinery. This sliding box and screw are represented at section 4, figure *t—u*. The movable carriage with the cylinders are carried by a screw or by a combination of cog-wheels operating on a cog rail. This screw is represented at figures 6 and 7, on the annexed drawing. The movable carriage in my machine now in operation is carried forward by a large iron screw twelve and a half feet long, and one and a half inch in diameter on which there are six threads to an inch and is connected to the main frame by inserting each end into a composition box or bearing, which boxes or bearings are connected to the side rails of the frame so that the screws run along parallel with the rail on the gear side of the frame (and if necessary a similar screw on the opposite side) by the side of the movable carriage. On the end of this long screw there is placed a cog wheel six inches in diameter. An iron shaft twelve inches long is fastened into two upright irons called jacks so confined to the timber marked E on the annexed drawing as to form two bearings for the ends of the twelve inch shaft. Near one end of this shaft there is a cog wheel eight inches in diameter which meshes into the cog wheel on the end of the screw. On the other end of this short shaft there is a bur geared cog wheel of the same dimensions which operates upon and is operated upon by two bevel geared cog wheels which are connected to the main shaft by a barrel sixteen inches in length, large enough to slide over the large shaft that passes across the head of the frame. This barrel is confined to the main shaft by a key or bolt which passes through the shaft and an oblong mortise in the barrel. The mortise being longer than the width of the key or bolt, this barrel being operated upon by a lever, slides back and forward on the main shaft, and thus either one or the other of the bevel geared cog wheels are made to mesh in with the bevel geared cog wheel on the short shaft aforesaid and turns the screw the way described. By this kind of gear the carriage can be carried back or forward. A section drawing of the aforesaid cog wheels is seen at Figs. 6 and 7.

The long screw, before described, passes through a nut divided into two parts, marked *a a b b*, Fig. 7, and so constructed as to open by means of a spring, and shut together and become closed upon the screw by means of an iron clasp. The drawing hereunto annexed, at section 7, prevents a view of each part of this nut. Through the ends of the long projections of this nut there is a round hole, as at letters *f f*, in which there is a bolt which fastens both parts of these long projections to the sill (marked *o*) of the movable carriage, as will be seen in the sectional drawing before described. On the outer parts of the nut there are two other curved projections, marked *c*, *c*, *d*, *d*, made to conform exactly to a section of the inside projection, and which extend out about eight inches. The last described projections, and the section of those inside that correspond to them form a curve of a radius twelve inches in length, exclusive of the width of the nut. The clasp that is used to close the nut is of iron, as represented at the letters marked *g g*, and is large enough to surround the nut, from the upper part of which there is an iron handle, or projection, one foot long, and secured to the upper end by being bolted to a piece of iron plate, fastened to the upright standards in the movable carriage. The handle, or projection to this clasp, is one inch wide and one half an inch thick. The clasp is forced backward and forward by a lever, whose fulcrum is fastened to the timber marked W, on the jet, and whose short arm is attached to the handle or projection near the clasp. The projections of the nut incline toward each other, as they extend from the main part of the nut, so that they are formed somewhat like a wedge, and thus the nut is closed when the clasp is forced up to the large part. When this nut is closed upon the screw, the carriage is carried forward or backward by the revolution of the screw; and when the nut is open, the movable carriage may be operated upon by the cog wheels and cog rail, hereafter to be described.

On each side of the main frame are placed upon the side rails, cog rails, fourteen feet long, one inch and a half wide, into which meshes cog wheels so constructed as to be geared and ungeared at pleasure, so that the carriage may be carried back with accelerated speed when necessary, as represented at section 9 on the drawing hereunto annexed. After the cylinder has passed over the stone, by means of the screw, the nut may be unclasped and the cog wheels brought in contact with the cog rail; and thus the whole carriage moved back in a short space of time. The wheel that meshes into the cog rail is moved by a cog wheel, that revolves on one of the shafts that move a cylinder, as will appear from the drawing hereunto annexed, at section 9.

The movable carriage may be carried backward and forward by worm screws, and worm wheels, in the manner following. The worm screws are attached to the shaft of the wheel connected to the iron cylinder and projecting on the outside of the jet. This worm screw is two and a half inches in diameter and operates upon and moves worm wheels one above and two below the worm screw. The upper and lower wheels are attached to two shafts two feet and a half long and two inches in diameter running parallel with the carriage and secured at the end near the worm wheels by iron boxes made fast to one of the upright standards, the other ends of the shafts pass through an iron with an opening sufficiently large for the shaft to slide up and down, so that the worm screw at the end of the shaft may be geared to the worm wheels above, or below, as they are raised upward or depressed. The shaft on which is placed the cog wheel that meshes into the cog rail passes across the movable carriage, and on the other end is another cog-wheel, which also meshes into a cog rail; and when they revolve, they carry the movable carriage. The horizontal shafts, above described, being thus permanently fixed at one end, and being at the other end so constructed as to rise and fall, are moved up and down so that either the upper or lower horizontal shaft can be brought in contact with the worm screw. These shafts are moved up and down by a lever attached to an upright iron plate, through which the ends of the horizontal shafts are fastened by a round bearing, so that by raising or depressing the arm of the lever, the iron plate, in which revolve the horizontal shafts, is raised or lowered at pleasure. The carriage can be carried back, when moved on the foregoing principle, as before described, and as represented at section 9 on the drawing annexed.

What I claim as new, and for which I ask Letters Patent, is—

The particular arrangement and combination of the cutting and polishing cylinders, the chisels or cutters used and invented by me for cutting, grooving and beading granite, marble or other stone, the method of raising and regulating the material to be operated upon and the arrangement of the machinery for moving and revolving the cylinders and moving the carriage.

JOHN D. BUZZELL.

Witnesses:
WILLIAM CUTTER,
JOHN MERRILL.

[FIRST PRINTED 1914.]